(12) United States Patent
Choi et al.

(10) Patent No.: US 10,625,695 B2
(45) Date of Patent: Apr. 21, 2020

(54) BUCKLING INDUCING-TYPE VEHICLE CRASH BOXES AND VEHICLE BACK BEAM HAVING SAME

(71) Applicant: LG Hausys, Ltd., Seoul (KR)

(72) Inventors: Hyun-Jin Choi, Ansan-si (KR); Dong-Won Kim, Gwangmyeong-si (KR); Yong-Han Kang, Seoul (KR); Hee-June Kim, Seongnam-si (KR); Kang-Hyun Song, Anyang-si (KR); Sang-Gyu Cho, Uiwang-si (KR); Kye-Woong Byun, Seoul (KR)

(73) Assignee: LG Hausys, Ltd., Seoul (KR)

( * ) Notice: Subject to any disclaimer, the term of this patent is extended or adjusted under 35 U.S.C. 154(b) by 43 days.

(21) Appl. No.: 15/760,059

(22) PCT Filed: Apr. 6, 2016

(86) PCT No.: PCT/KR2016/003585
§ 371 (c)(1),
(2) Date: Mar. 14, 2018

(87) PCT Pub. No.: WO2017/047894
PCT Pub. Date: Mar. 23, 2017

(65) Prior Publication Data
US 2018/0257588 A1    Sep. 13, 2018

(30) Foreign Application Priority Data
Sep. 14, 2015  (KR) .................. 10-2015-0129808

(51) Int. Cl.
*B60R 19/34*    (2006.01)
*B60R 19/18*    (2006.01)
(Continued)

(52) U.S. Cl.
CPC .............. *B60R 19/34* (2013.01); *B60R 19/18* (2013.01); *F16F 7/003* (2013.01); *F16F 7/128* (2013.01)

(58) Field of Classification Search
CPC .......... B60R 19/34; B60R 19/18; F16F 7/128; F16F 7/003; B62D 21/152
(Continued)

(56) References Cited

U.S. PATENT DOCUMENTS 6,932,201 B2 * 8/2005 Akiyama ................ B60R 19/22
                                                    188/371
7,677,617 B2 * 3/2010 Stewart .................. B60R 19/34
                                                    293/133
(Continued)

FOREIGN PATENT DOCUMENTS

DE    10327604 B4 * 11/2009  ............. B60R 19/22
JP    2009-61845 A    3/2009
(Continued)

OTHER PUBLICATIONS

The International Search Report for PCT/KR2016/003585 dated Jul. 12, 2016, citing above references.
(Continued)

*Primary Examiner* — Pinel E Romain
(74) *Attorney, Agent, or Firm* — Hauptman Ham, LLP

(57) ABSTRACT

The present invention provides buckling inducing-type vehicle crash boxes. The buckling inducing-type vehicle crash boxes are arranged at both ends of a back beam and comprise: a box body part; and a reinforcing part, which is formed in a lattice shape, is formed to integrally protrude from the outer surface of the box body part, induce buckling along the longitudinal direction of the box body part by an external impact, and absorb energy generated by to the impact.

6 Claims, 14 Drawing Sheets

(51) Int. Cl.
*F16F 7/00* (2006.01)
*F16F 7/12* (2006.01)

(58) Field of Classification Search
USPC .......................................................... 293/133
See application file for complete search history.

(56) References Cited

U.S. PATENT DOCUMENTS

| | | | | |
|---|---|---|---|---|
| 8,844,987 | B2* | 9/2014 | Kaneko | B60R 19/34 |
| | | | | 293/133 |
| 2002/0158384 | A1* | 10/2002 | Beck | B60R 19/34 |
| | | | | 267/139 |
| 2009/0000506 | A1* | 1/2009 | Jaede | B61D 15/06 |
| | | | | 105/392.5 |
| 2011/0193369 | A1* | 8/2011 | Wuest | B60R 19/34 |
| | | | | 296/187.03 |
| 2014/0354008 | A1 | 12/2014 | Sakakibara et al. | |
| 2015/0069773 | A1* | 3/2015 | Mukainakano | B60R 19/03 |
| | | | | 293/122 |
| 2016/0332587 | A1 | 11/2016 | Ginja et al. | |
| 2017/0233008 | A1* | 8/2017 | Otsuka | B62D 21/02 |
| | | | | 296/193.05 |
| 2017/0327065 | A1* | 11/2017 | So | B60R 19/34 |
| 2018/0251088 | A1* | 9/2018 | Kawamura | B60R 19/03 |

FOREIGN PATENT DOCUMENTS

| | | |
|---|---|---|
| KR | 10-0813158 B1 | 3/2008 |
| KR | 10-2010-0035274 A | 4/2010 |
| KR | 10-1106330 B1 | 1/2012 |
| KR | 10-2013-0049338 A | 5/2013 |
| KR | 10-2013-0126355 A | 11/2013 |
| KR | 1020150129204 A | 11/2015 |
| WO | 2015097410 A1 | 7/2015 |

OTHER PUBLICATIONS

Extended European Search Report dated Jun. 22, 2018, corresponding to European Application No. 16846716.5 citing the above reference(s).

* cited by examiner

BUCKLING INDUCING-TYPE VEHICLE CRASH BOXES AND VEHICLE BACK BEAM HAVING SAME

CROSS REFERENCE TO RELATED APPLICATION

This present application is a national stage filing under 35 U.S.C § 371 of PCT application number PCT/KR2016/003585 filed on Apr. 6, 2016 which is based upon and claims the benefit of priority to Korean Patent Application No. 10-2015-0129808 filed on Sep. 14, 2015, in the Korean Intellectual Property Office. The disclosures of the above-listed applications are hereby incorporated by reference herein in their entirety.

BACKGROUND

1. Technical Field

The present application claims priority to Korean Patent Application No. 10-2015-0129808 filed on Sep. 14, 2015 in the Republic of Korea, the disclosures of which are incorporated herein by reference.

The present disclosure relates to buckling inducing-type vehicle crash boxes, and more particularly, to buckling inducing-type vehicle crash boxes capable of safely protecting a vehicle body by inducing a buckling at the time of external impact to increase an absorption rate of impact energy in a crash box itself and to reduce the impact energy transferred to the vehicle body, and a vehicle back beam having the same.

2. Description of the Related Art

Bumpers are generally installed on the front and rear of a vehicle to absorb impact energy applied to a vehicle body at the time of collision or bump accident and to provide safety of passengers.

A conventional bumper includes a bumper beam, an absorber, and a bumper cover.

The bumper beam is welded and coupled to an end portion of a bumper stay coupled to the vehicle body.

The absorber is attached onto an outer surface of the bumper beam to absorb impact energy applied to the vehicle body.

The bumper cover is installed on the vehicle body to enclose the absorber and is exposed externally from the vehicle.

Meanwhile, a crash box fixed onto a front surface of a side member coupled to a vehicle body frame to absorb impact at the time of low speed collision and minimize damage on the vehicle is installed between the bumper and the vehicle body frame.

A conventional crash box has a thickness of a wall of 6 mm to 10 mm, and has a linear reinforcing member formed on an outer surface of the box.

According to the structure described above, resistance to external force of the crash box is increased, and when the external impact occurs, an initial load is high, but a buckling is not easily generated, and the crash box is thus broken and impact load is suddenly reduced, thereby causing a low absorption rate of impact energy.

Moreover, as the crash box has the low absorption rate of impact energy, the impact energy remaining after the collision is absorbed by a vehicle body member, thereby damaging the vehicle body.

The prior art document associated with the present disclosure is Korean Patent Laid-Open Publication No. 10-2011-0072902 (date of publication: Jun. 29, 2011).

SUMMARY

It is an object of the present disclosure is to provide buckling inducing-type vehicle crash boxes capable of improving an absorption rate of impact energy in a box body part itself by sequentially performing a buckling along a longitudinal direction of the box body part when external impact occurs.

It is another object of the present disclosure is to provide buckling inducing-type vehicle crash boxes capable of efficiently absorbing impact energy and preventing the impact energy from being transferred to a vehicle body by forming main reinforcing members of a sawtooth shape along a longitudinal direction of a box body part and auxiliary reinforcing members along a width direction thereof in a lattice shape on a wall surface of the box body part to allow resistance load to external force to be gradually increased and to allow the main reinforcing members and the auxiliary reinforcing members to be entangled and compressed to each other when a buckling sequentially occurs.

In accordance with one aspect of the present disclosure, buckling inducing-type vehicle crash boxes are provided.

The buckling inducing-type vehicle crash boxes are arranged at both ends of a back beam, and the buckling inducing-type vehicle crash boxes includes: a box body part; and a reinforcing part, which is formed in a lattice shape, protrudes externally from an outer surface portion of the box body part, induces a buckling a longitudinal direction of the box body part by external impact, and absorbs energy generated by the impact.

The box body part may be formed in walls of a quadrangular shape to form a hollow of a quadrangular shape.

Thicknesses of the walls along a longitudinal direction of the back beam may be the same as each other.

The thicknesses of the walls may be formed in the range of 3 mm to 7 mm.

The reinforcing part may include a plurality of main reinforcing members on which buckling inducing protrusions inducing the buckling are repeatedly formed along the longitudinal direction of the box body part, and spaced part from each other along a with direction of the box body part, and a plurality of auxiliary reinforcing members following the width direction of the box body part, spaced apart from each other along the longitudinal direction of the box body part, and intersecting with the plurality of main reinforcing members.

The buckling inducing protrusions may be formed in a sawtooth or corrugation shape.

The plurality of auxiliary reinforcing members may connect an upper end and a lower end of each of the buckling inducing protrusions to each other.

One end of the box body part may be connected to the back beam, the other end of the box body part may be connected to a vehicle body facing the back beam, the respective buckling inducing protrusions may have cross sections which are a right-angled triangle shape and repeatedly connected to each other, and an inclined surface of each of the buckling inducing protrusions may be downwardly inclined along the other end of the box body part.

The reinforcing part may be formed on a wall of the box body part which is orthogonal to a longitudinal direction of the back beam.

In accordance with another aspect of the present disclosure, a vehicle back beam including the buckling inducing-type vehicle crash boxes is provided.

According to the present disclosure, when the external impact occurs, the buckling is sequentially performed along the longitudinal direction of the box body part, thereby making it possible to improve the absorption rate of impact energy in the box body part itself.

Further, according to the present disclosure, it is possible to efficiently absorb the impact energy and prevent the impact energy from being transferred to the vehicle body by forming the main reinforcing members of a sawtooth shape along the longitudinal direction of the box body part and the auxiliary reinforcing members along the width direction thereof in the lattice shape on the wall surface of the box body part to allow resistance load to external force to be gradually increased and to allow the main reinforcing members and the auxiliary reinforcing members to be entangled and compressed to each other when the buckling sequentially occurs.

DETAILED DESCRIPTION

Hereinafter, a buckling inducing-type vehicle crash box according to the present disclosure will be described with reference to the accompanying drawings.

Figure 1:
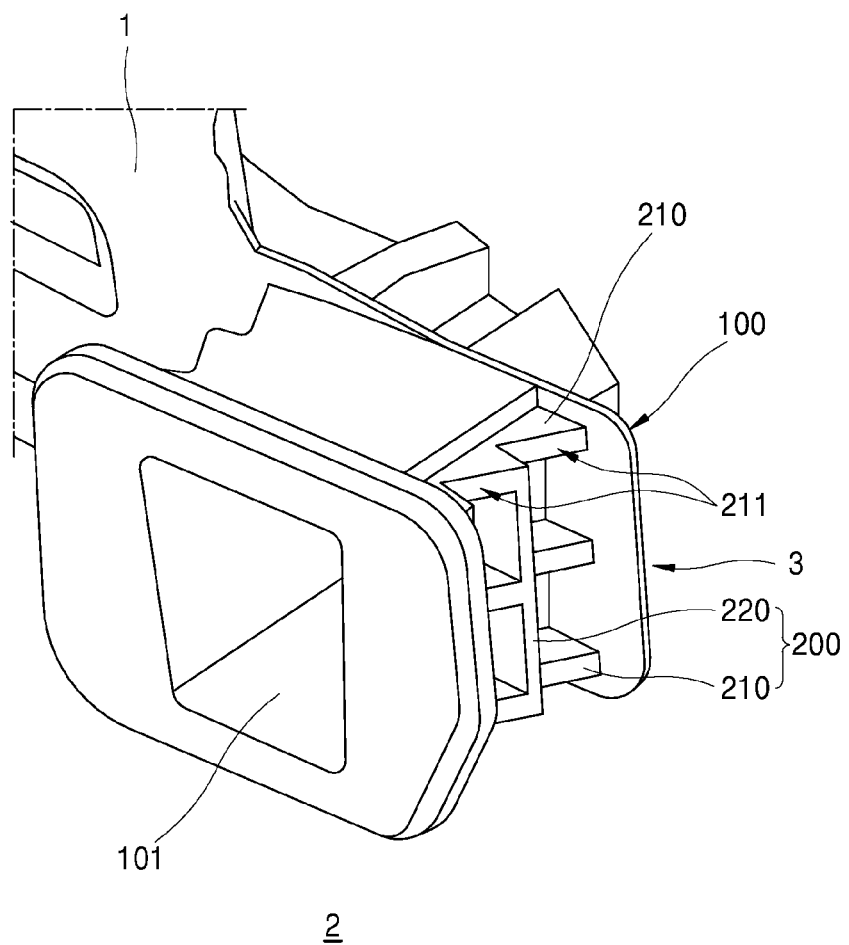
FIG. 1 is a perspective view showing a buckling inducing-type vehicle crash box according to the present disclosure.
Figure 2:
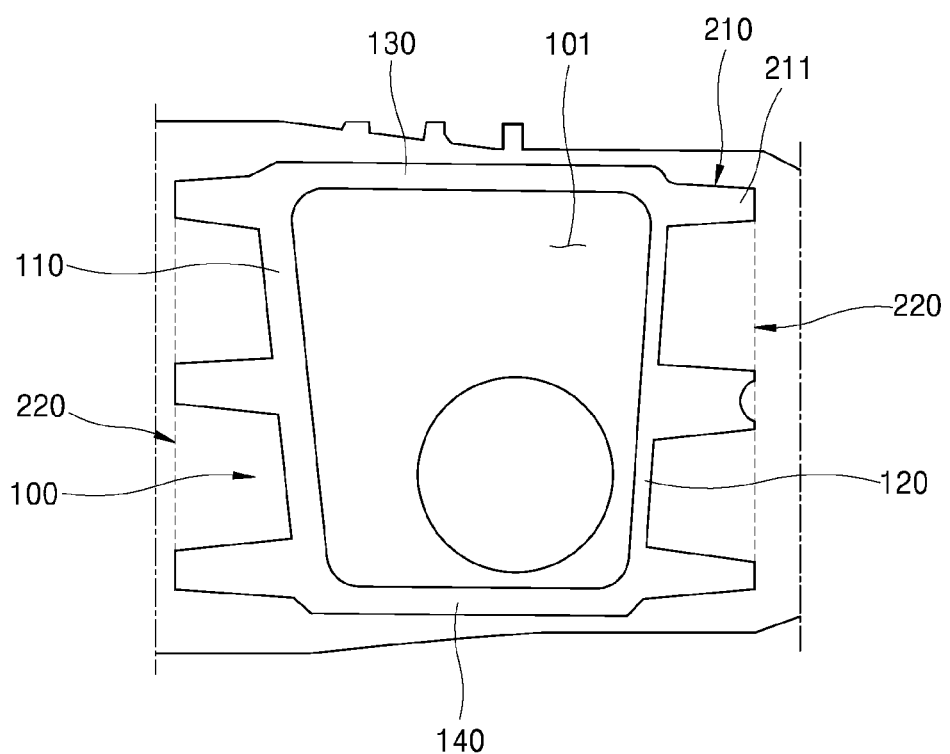
FIG. 2 is a cross-sectional view showing the buckling inducing-type vehicle crash box according to the present disclosure.
Figure 3:
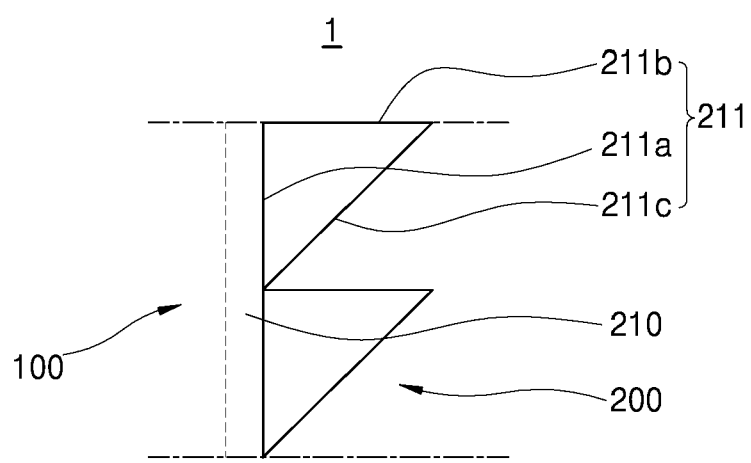
FIG. 3 is a view showing a buckling inducing protrusion according to the present disclosure.

FIG. 1 is a perspective view showing a buckling inducing-type vehicle crash box according to the present disclosure and FIGS. 2 and 3 are cross-sectional views showing the buckling inducing-type vehicle crash box according to the present disclosure.

A configuration of a buckling inducing-type vehicle crash box and a vehicle back beam having the same according to the present disclosure will be described with reference to FIGS. 1 to 3.

A vehicle back beam 1 according to the present disclosure is preferably a rear back beam arranged at a rear end of a vehicle body 2

Buckling inducing-type vehicle crash boxes 3 according to the present disclosure are in a pair, and are installed at both ends of the back beam 1.

In addition, the pair of buckling inducing-type vehicle crash boxes 3 is connected to the vehicle body 2.

The pair of buckling inducing-type vehicle crash boxes 3 has the same configuration as each other.

The buckling inducing-type vehicle crash boxes 3 installed at both ends of the back beam 1 as described above generally includes a box body part 100 and a reinforcing part 200.

The box body part 100 is formed by connecting four walls 110, 120, 130, and 140 to each other to form a hollow 101 of a quadrangular shape. The box body part 100 is manufactured by a molding.

The four walls 110, 120, 130, and 140 of the box body part 100 may have different thicknesses.

Preferably, two walls 130 and 140 facing each other among the four walls 110, 120, 130, and 140 may have the same thickness and the remaining two walls 110 and 120 may have different thicknesses.

Here, walls arranged to be spaced apart from each other along a longitudinal direction of a back beam 1 among the four walls 110, 120, 130, and 140 are referred as first and second walls 110 and 120, and walls connecting both sides of the first and second walls 110 and 120 are referred to as third and fourth walls 130 and 140.

Preferably, a thickness of the first wall 110 may be 7 mm, a thickness of the second wall 120 may be 3 mm, and the third and fourth walls 130 and 140 may have the same thickness as each other of 6 mm.

That is, the thickness of the walls of the box body part 100 according to the present disclosure is in the range of 3 mm to 7 mm.

Compared to the thickness of the walls of the crash boxes 3 of 6 mm to 10 mm corresponding to a comparative example to be described below, the thickness of the wall of crash boxes 3' according to the present disclosure corresponding to an inventive example may be thinned at a ratio of 20 to 50% of the comparative example.

Meanwhile, referring to FIGS. 1 and 2, the reinforcing part 200 according to the present disclosure is formed integrally on an outer surface of the box body part 100.

The reinforcing part 200 includes a plurality of main reinforcing members 210 and a plurality of auxiliary reinforcing members 220.

The plurality of main reinforcing members 210 protrude from the outer surface of the box body part 100 along a longitudinal direction of the box body part 100 and protrude from the outer surface of the box body part 100 to be spaced apart from each other along a width direction of the box body part 100.

The plurality of main reinforcing members 210 are formed to be symmetrical with each other on the first and second walls 110 and 120.

Of course, in the plurality of main reinforcing members 210 formed on the first and second walls 110 and 120, the main reinforcing members 210 formed on the second wall 120 having the thickness of 3 mm may be thicker than the main reinforcing members 210 formed on the first wall 110 having the thickness of 7 mm.

Here, the plurality of main reinforcing members 210 have buckling inducing protrusions 211 having a sawtooth or corrugation shape which are repeatedly formed along a longitudinal direction thereof.

The buckling inducing protrusions 211 preferably has cross sections in which right-angled triangle shapes are repeatedly formed.

Therefore, each of the buckling inducing protrusions 211 may be formed to be enclosed by a bottom surface 211a and a linear surface 211b forming a right angle with each other, and an inclined surface 211c connecting the linear surface 211b and the bottom surface 211a to each other.

As shown in FIGS. 1 and 2, the linear surface 211b of the buckling inducing protrusion 211 connected to the back beam 1 among the respective buckling inducing protrusions 211 is connected to a rear surface of the back beam 1 to be closely in contact with the rear surface of the back beam 1.

In addition, the inclined surfaces 211c of the respective buckling inducing protrusions 211 are arranged to be repeatedly inclined downwardly toward the vehicle body 2 from the back beam 1.

This may induce the box body part 100 to be sequentially compressed, i.e., induce the buckling to be sequentially performed, when external impact is applied to the back beam 1.

In addition, the plurality of auxiliary reinforcing members 220 protrude from outer surfaces of the first and second walls 110 and 120 of the box body part 100 along the width direction of the box body part 100 and protrude from the outer surfaces of the first and second walls 110 and 120 of the box body part 100 to be spaced apart from each other along the longitudinal direction of the box body part 100.

Preferably, each of the plurality of auxiliary reinforcing members 220 protrudes to connect a connection portion between the main reinforcing members 210 described above.

Therefore, the plurality of auxiliary reinforcing members 220 connect a lower end and an upper end of each of the buckling inducing protrusions 211 to each other.

The auxiliary reinforcing members 220 absorb impact energy due to an impact by supporting the main reinforcing members 210 while the buckling occurs.

An impact absorption by the reinforcing part 200 at the time of occurrence of the buckling will be described below.

Further, inside buckling inducing protrusions (not shown) may be further formed on inside surface portions of the first and second walls 110 and 120 of the crash box 3 described above.

The inside buckling inducing protrusions may also be formed in a form of a groove having the same shape as the shape of the buckling inducing protrusion 211 on the inside surface portions of the first and second walls 110 and 120.

Therefore, cross sections of the first and second walls 110 and 120 may also be formed in a sawtooth shape.

Accordingly, when the back beam 1 collides with an outer wall and impact force occurs, the buckling may also be more easily induced through the buckling inducing protrusion 211, and the cross section of the sawtooth shape formed between the inside buckling inducing protrusions.

Figure 4:
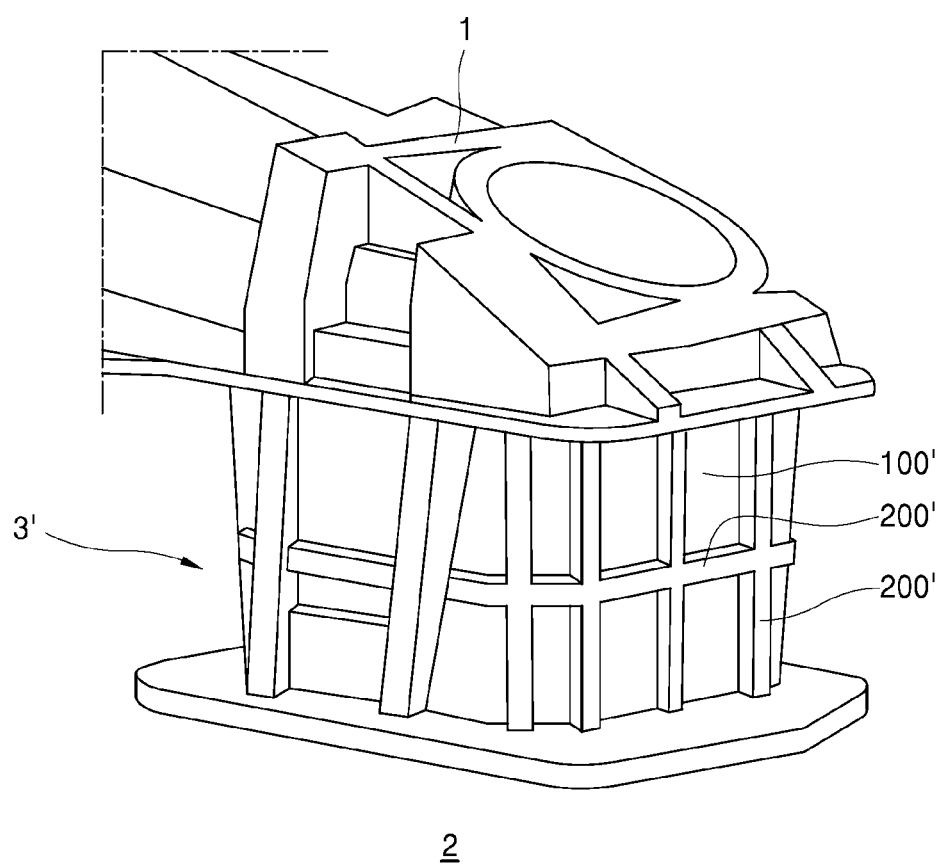
FIGS. 4 to 6 are views showing comparative examples of a crash box.
Figure 5:
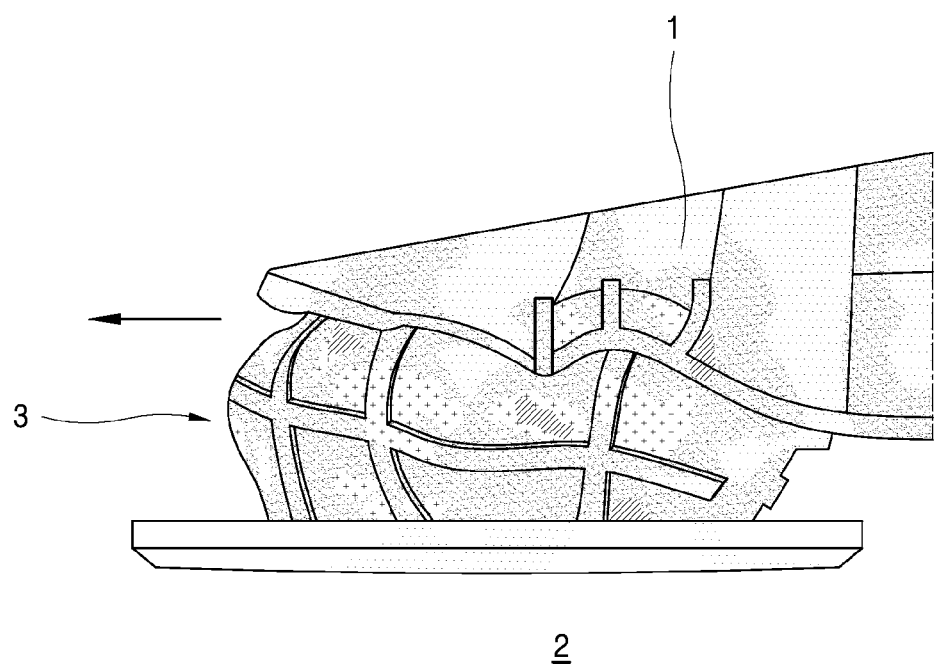
Figure 6:
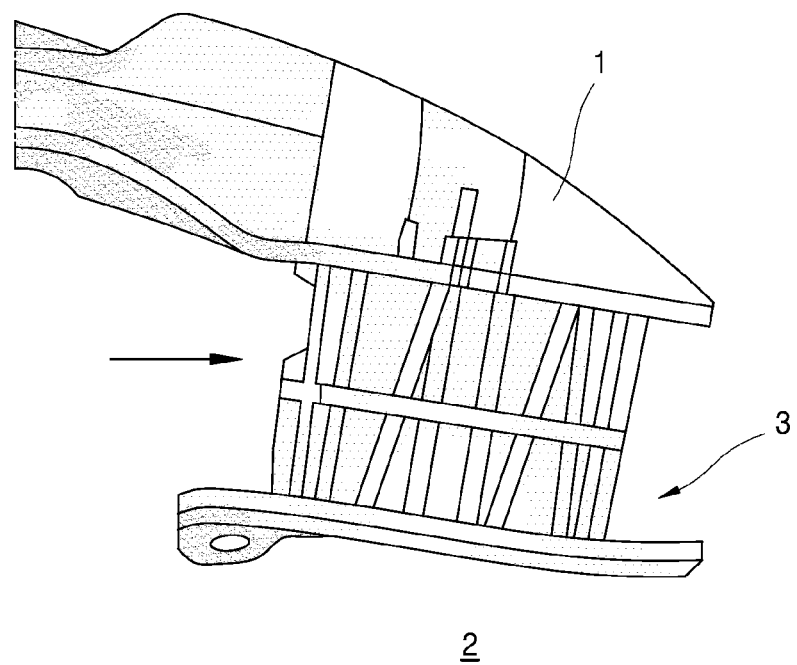
Figure 7:
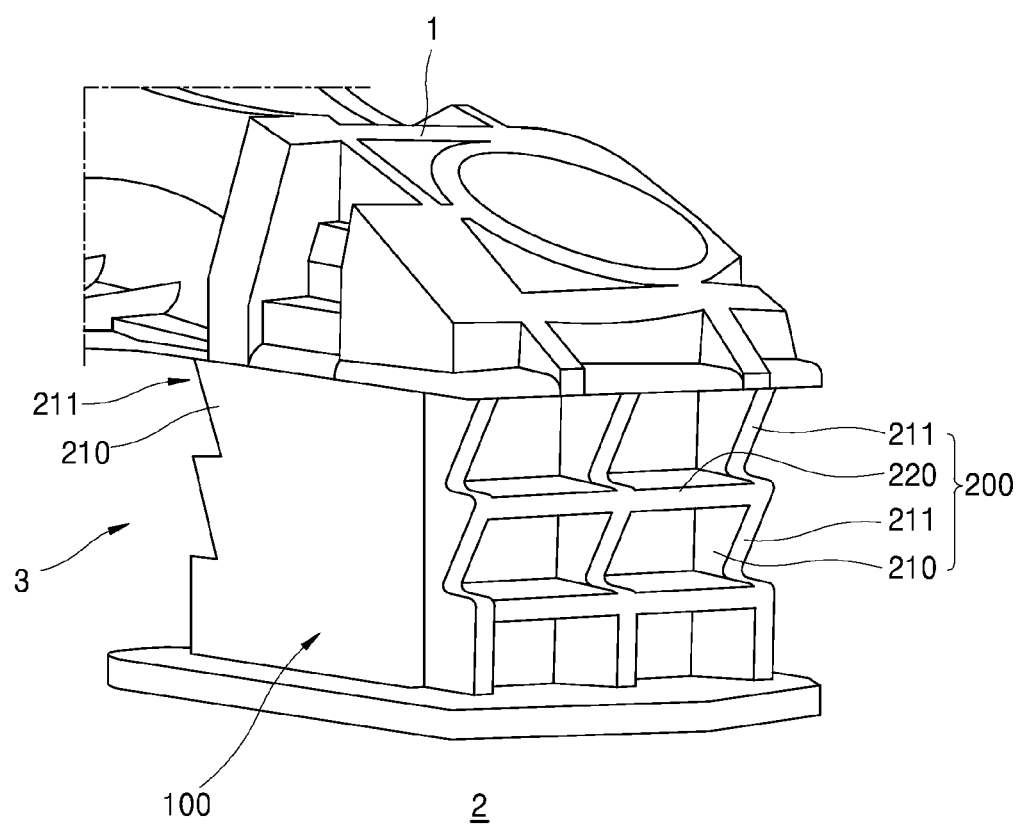
FIGS. 7 to 9 are views showing inventive examples of a crash box.
Figure 8:
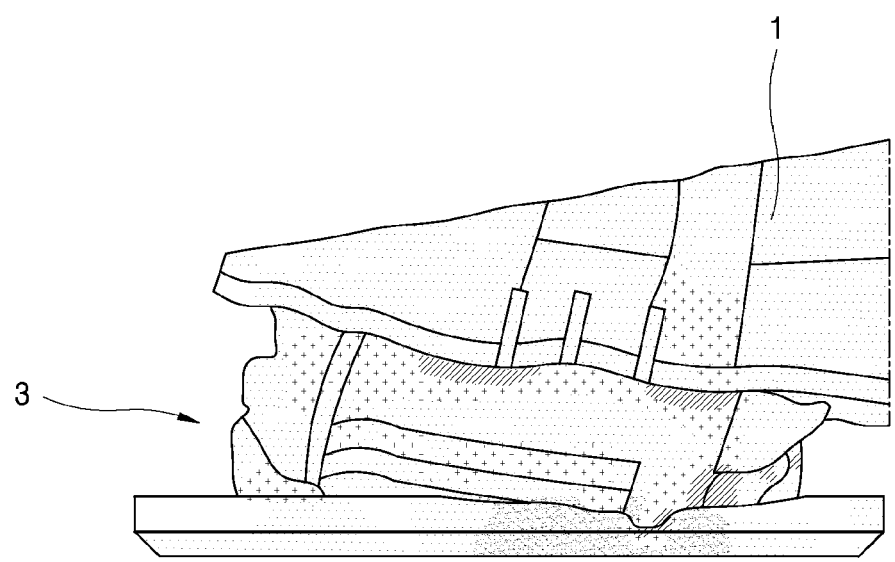
Figure 9:
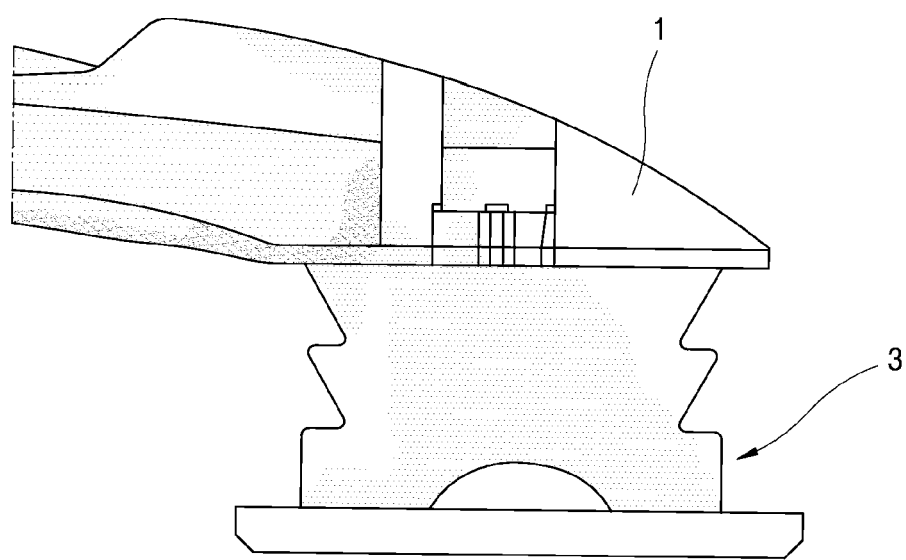

FIGS. 4 to 6 are views showing comparative examples of a crash box and FIGS. 7 to 9 are views showing inventive examples of a crash box.

Referring to FIG. 4, reinforcing members 200' which are in a lattice shape protrude from an outer surface portion around a box body part 100' of a comparative example of a crash box 3'.

An upper end of the crash box 3' having the condition described above is connected to both ends of the back beam 1, and a lower end of the crash box 3' is connected to the vehicle body.

Further, a first wall of the box body part 100' according to the comparative example has a thickness of 10 mm, a second wall thereof has a thickness of 6 mm, and third and fourth walls have a thickness of 9 mm.

FIGS. 5 and 6 are views showing simulation results of a case in which external impact is applied to one end of the back beam.

Referring to FIG. 5, it is shown that the crash box 3' of a side to which the external impact is applied is pushed out while protruding externally from the back beam 1 along an arrow direction and a deformation occurs.

Further, referring to FIG. 6, it is shown that the crash box 3' of a side to which the external impact is not applied is not compressively deformed, but is pushed out to be inclined along an arrow direction directed to the outside of the back beam 1.

On the other hand, referring to FIG. 7, an inventive example of the crash box 3 is shown.

As described above, the reinforcing part 200 which is formed in the lattice shape and sequentially induces the buckling at the time of occurrence of the external impact is formed on the outer surface portions of the first and second walls 110 and 120 of the box body part 100.

Since a configuration of the reinforcing part 200' is the same as that described with reference to FIGS. 1 and 2, a description thereof will be omitted.

An upper end of the crash box 3 having the condition described above is connected to both ends of the back beam 1, and a lower end of the crash box 3 is connected to the vehicle body 2.

FIGS. 8 and 9 are views showing simulation results of a case in which external impact is applied to one end of the back beam.

Referring to FIG. 8, it is shown that in a state in which the crash box 3 of the side to which the external impact is applied does not protrude externally from the back beam 1, the crash box 3 is compressively deformed while the buckling is sequentially induced by the plurality of buckling inducing protrusions 211.

Further, referring to FIG. 9, it is shown that the crash box 3' of the side to which the external impact is not applied is not compressively deformed, and is not inclined to the outside of the back beam 1. That is, an amount of push may be less than the comparative example.

A process of inducing the buckling will be described.

Referring to FIGS. 7 to 9, when the external impact is applied to one side of the back beam 1, impact is applied to the crash box 3 arranged at the corresponding position.

The main reinforcing members 210 formed along the longitudinal direction of the crash box 3 on the outer surface of the crash box 3 according to the inventive example sequentially induce the buckling while being applied with the impact.

That is, the plurality of buckling inducing members 211 are formed on each of the main reinforcing members 210. Such a buckling inducing member 211 is formed in a sawtooth or corrugation shape, thereby inducing sequentially the buckling.

Therefore, a resistance load to the external impact is gradually increased.

In addition, the thickness of the wall of the box body part 100 according to the inventive example is thinner than the thickness of the wall of the comparative example, thereby easily implementing the occurrence of buckling.

While the buckling sequentially occurs as described above, it is possible to prevent the main reinforcing members 210 from being collapsed and to efficiently absorb impact energy by supporting the main reinforcing members 210 by the auxiliary reinforcing members 220 connecting the main reinforcing members 210 along the width direction of the box body part 100.

Accordingly, as shown in FIG. 8, as the main reinforcing members 210 and the auxiliary reinforcing members 220 are entangled and compressed to each other while the buckling occurs, it is possible to maximize the absorption of the impact energy.

In addition, a push distance result according to impact force over time at the time of collision refers to FIGS. 10 to 13.

Figure 10:
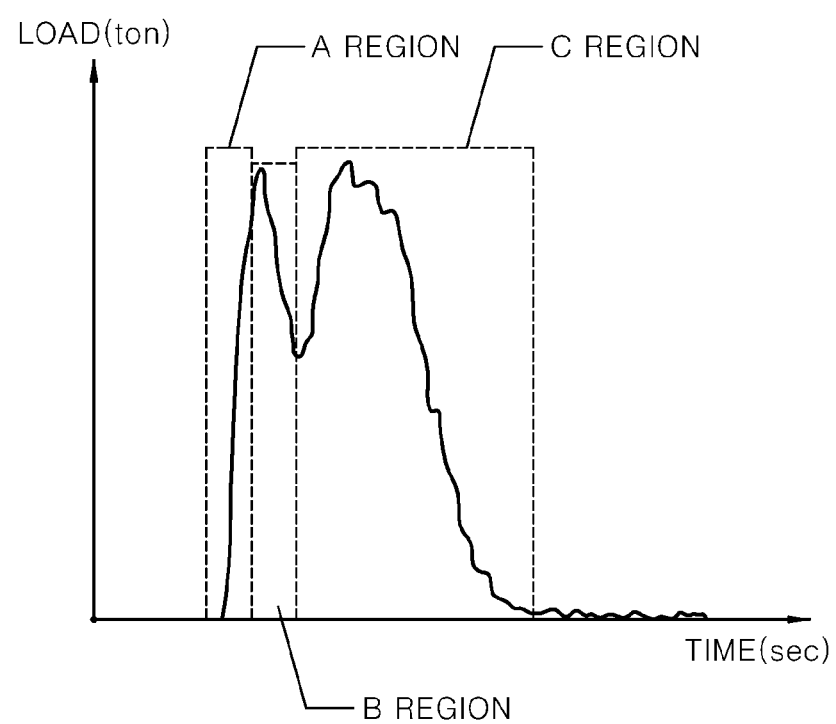
FIG. 10 is a graph for interpreting load results according comparative examples and inventive examples.

FIG. 10 is a graph for interpreting load results according comparative examples and inventive examples.

Figure 11:
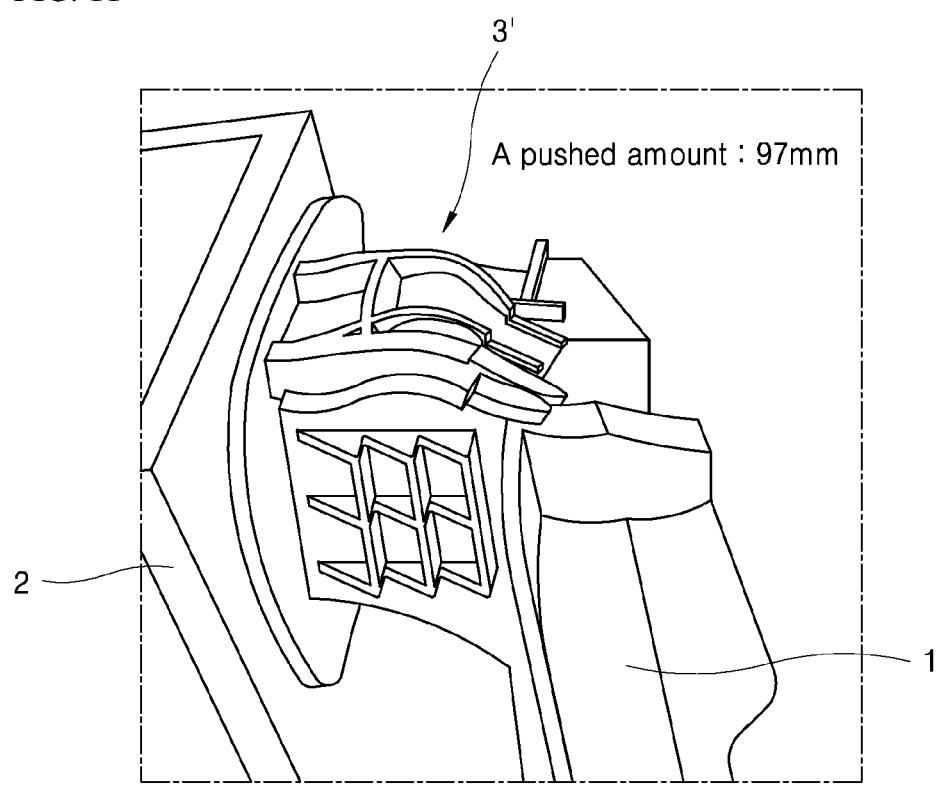
FIG. 11 is a view showing an actual state after collision of the comparative example.
Figure 12:
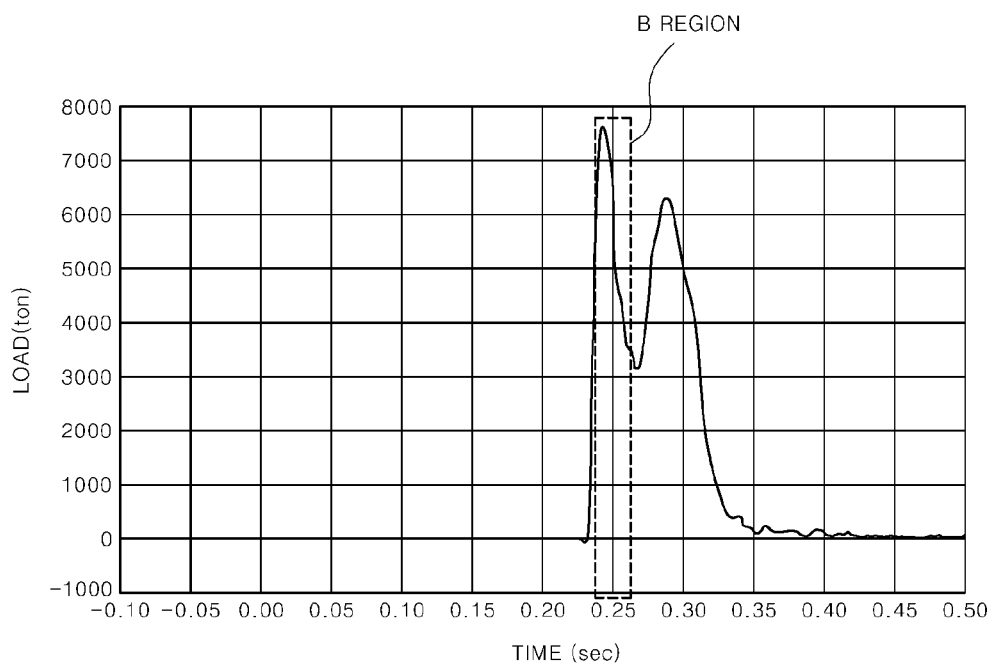
FIG. 12 is a graph showing impact force over time at the time of collision of the comparative example.

FIG. 11 is a view showing an actual state after collision of the comparative example and FIG. 12 is a graph showing impact force over time at the time of collision of the comparative example.

Figure 13:
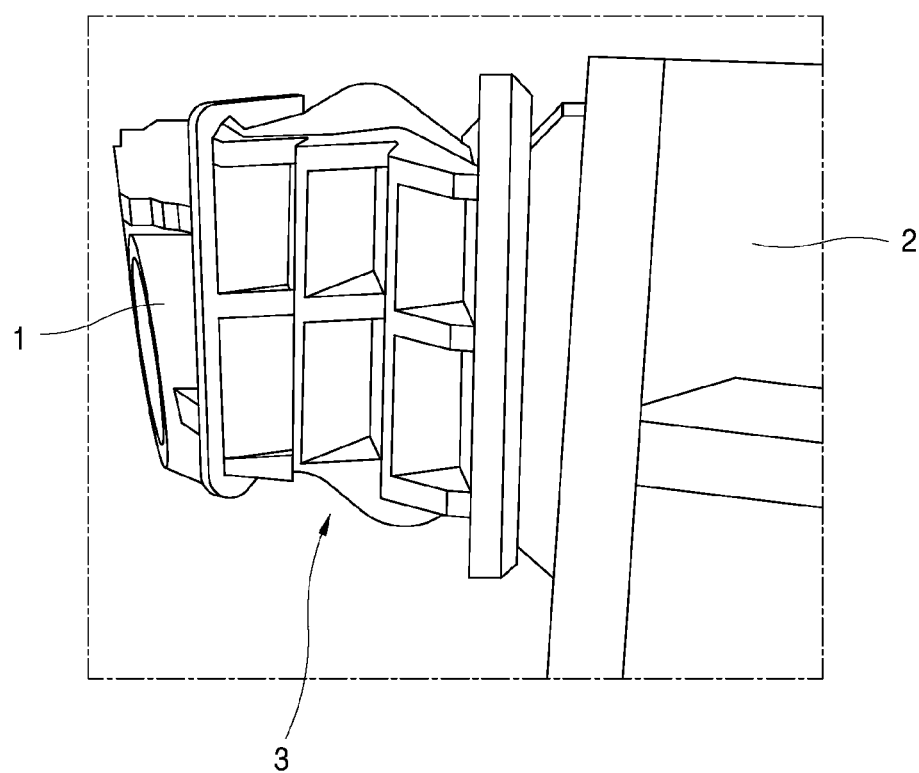
FIG. 13 is a view showing an actual state after collision of the inventive example.
Figure 14:
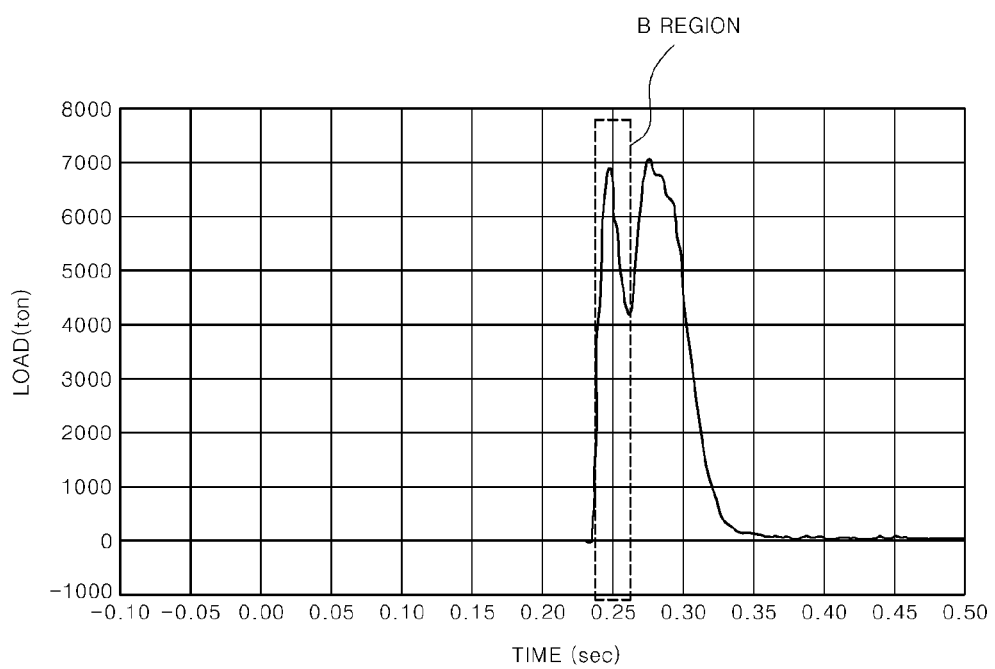
FIG. 14 is a graph showing impact force over time at the time of collision of the inventive example.

Further, FIG. 13 is a photograph showing an actual state after collision of the inventive example and FIG. 14 is a graph showing a load over time at the time of collision of the inventive example.

Here, the above-mentioned load is reaction force required for the back beam to absorb energy when the back beam collides with the outer wall.

That is, the load is a resistance value for absorbing impact energy.

Here, regions A, B, and C will be described with reference to FIG. 10.

The region A is a section in which the back beam is supported without being greatly deformed.

The region A is referred to as an initial load section and has characteristics that cracks are generated immediately after the collision if rigidity of the beam is weak, and an initial load is low.

The region B is a section in which resistance is weakened while a predetermined portion of the back beam is collapsed. That is, the region B is a section in which the buckling occurs.

The region B has characteristics that an amount of falling load is small as the buckling ideally occurs.

Therefore, a value of falling load is reduced by the ideal buckling, thereby making it possible to minimize an amount of residual energy absorbed by the vehicle.

The region C shows an amount of energy that the residual energy enters the vehicle body after the buckling is fully performed.

As the regions A and B absorb a great amount of energy, the energy absorbed by the vehicle is reduced.

Referring to FIGS. 12 and 14, it may be seen that impact energy generated in the inventive example is lower than that in the comparative example when impact is applied to one side of the back beam 1 and the crash boxes 3 and 3' are buckled.

In the region B, which is the section in which the buckling occurs, shown in FIGS. 11 and 12 (comparative example), it may be seen that an amount of falling load is greater than that of the region B shown in FIGS. 13 and 14 (inventive example).

That is, the inventive example of the present disclosure shows the amount of load in the section in which the buckling occurs relatively less than the comparative example, thereby making it possible to efficiently minimize an amount of residual energy absorbed by the vehicle.

In addition, when the back beam 1 collides with the outer wall, a pushed amount of each of the crash boxes 3' and 3 is 97 mm in the comparative example and is 85 mm in the inventive example.

Therefore, the pushed amount in the inventive example shows a result that 12 mm is reduced as compared to the comparative example.

Here, the pushed amount means that a movement distance is reduced to 12 mm after the vehicle 1 collides with the outer wall.

For example, a distance between a rear fog lamp of the vehicle and the outer wall is increased by 12 mm, and the inventive example may secure more marketability than the comparative example because probability that the rear fog lamp collides with the outer wall is reduced.

As a result, as compared to the comparative example, in the inventive example, since the buckling of the crash box is sequentially performed and the main reinforcing members and the auxiliary reinforcing members absorb the impact energy while being compressed to each other, the impact force transferred to the vehicle body may be low.

Accordingly, the inventive example of the present disclosure shows that the impact energy is efficiently absorbed, and the distance pushed externally from the back beam is shorter than that of the comparative example.

Therefore, when the buckling occurs, the distance that the box body part 100 is externally pushed may be smaller than that of the comparative example.

As a result, as the crash box 3 itself maximally absorbs the impact energy as described above, the amount of impact energy transferred to the vehicle body is reduced, thereby making it possible to protect the vehicle body.

As described above, according to the above-mentioned configuration and operation, the inventive example of the present disclosure may improve an absorption rate of the impact energy in the box body part itself by allowing the buckling to be sequentially performed along the longitudinal direction of the box body part when the external impact occurs.

Further, according to the inventive example of the present disclosure, it is possible to efficiently absorb the impact energy and prevent the impact energy from being transferred to the vehicle body by forming the main reinforcing members of a sawtooth shape along the longitudinal direction of the box body part and the auxiliary reinforcing members along the width direction thereof in the lattice shape on the wall surface of the box body part to allow resistance load to external force to be gradually increased and to allow the main reinforcing members and the auxiliary reinforcing members to be entangled and compressed to each other when the buckling sequentially occurs.

Hereinabove, while specific exemplary embodiments of the buckling inducing-type vehicle crash boxes and the vehicle back beam having the same according to the present disclosure have been described, various modifications may be made without departing from the scope of the present disclosure.

Accordingly, the scope of the present disclosure is not construed as being limited to the described embodiments, but is defined by the appended claims as well as equivalents thereto.

It is to be understood that the exemplary embodiments described above are illustrative in all aspects and not restrictive, and it should be interpreted that the scope of the present disclosure is defined by the following claims rather than the above-mentioned detailed description and all modifications or alterations deduced from the meaning, the scope, and equivalences of the claims are included in the scope of the present disclosure.

What is claimed is:

1. A buckling inducing-type vehicle crash boxes, wherein the buckling inducing-type vehicle crash boxes are arranged at both ends of a back beam, the buckling inducing-type vehicle crash boxes comprising:
- a box body part; and
- a reinforcing part, which is formed in a lattice shape, protrudes externally an outer surface portion of the box body part, induces a buckling a longitudinal direction of the box body part by external impact, and absorbs energy generated by the impact, wherein the reinforcing part is formed on a wall of the box body part which is orthogonal to a longitudinal direction of the back beam.

2. The buckling inducing-type vehicle crash boxes of claim 1, wherein the reinforcing part includes:
- a plurality of main reinforcing members on which buckling inducing protrusions inducing the buckling are repeatedly formed along the longitudinal direction of the box body part, and spaced part from each other along a with direction of the box body part, and
- a plurality of auxiliary reinforcing members following the width direction of the box body part, spaced apart from each other along the longitudinal direction of the box body part, and intersecting with the plurality of main reinforcing members.

3. The buckling inducing-type vehicle crash boxes of claim 2, wherein the buckling inducing protrusions are formed in a sawtooth or corrugation shape.

4. The buckling inducing-type vehicle crash boxes of claim 3, wherein the plurality of auxiliary reinforcing members connect an upper end and a lower end of each of the buckling inducing protrusions to each other.

5. The buckling inducing-type vehicle crash boxes of claim 3, wherein one end of the box body part is connected to the back beam,
- the other end of the box body part is connected to a vehicle body facing the back beam,
- the buckling inducing protrusions have cross sections which are a right-angled triangle shape and repeatedly connected to each other, and
- an inclined surface of each of the buckling inducing protrusions is downwardly inclined along the other end of the box body part.

6. A vehicle back beam including the buckling inducing-type vehicle crash boxes of claim 1.

* * * * *